Sept. 20, 1927.
F. L. LAWRENCE
1,643,248
WHEEL
Filed March 4, 1927
2 Sheets-Sheet 1
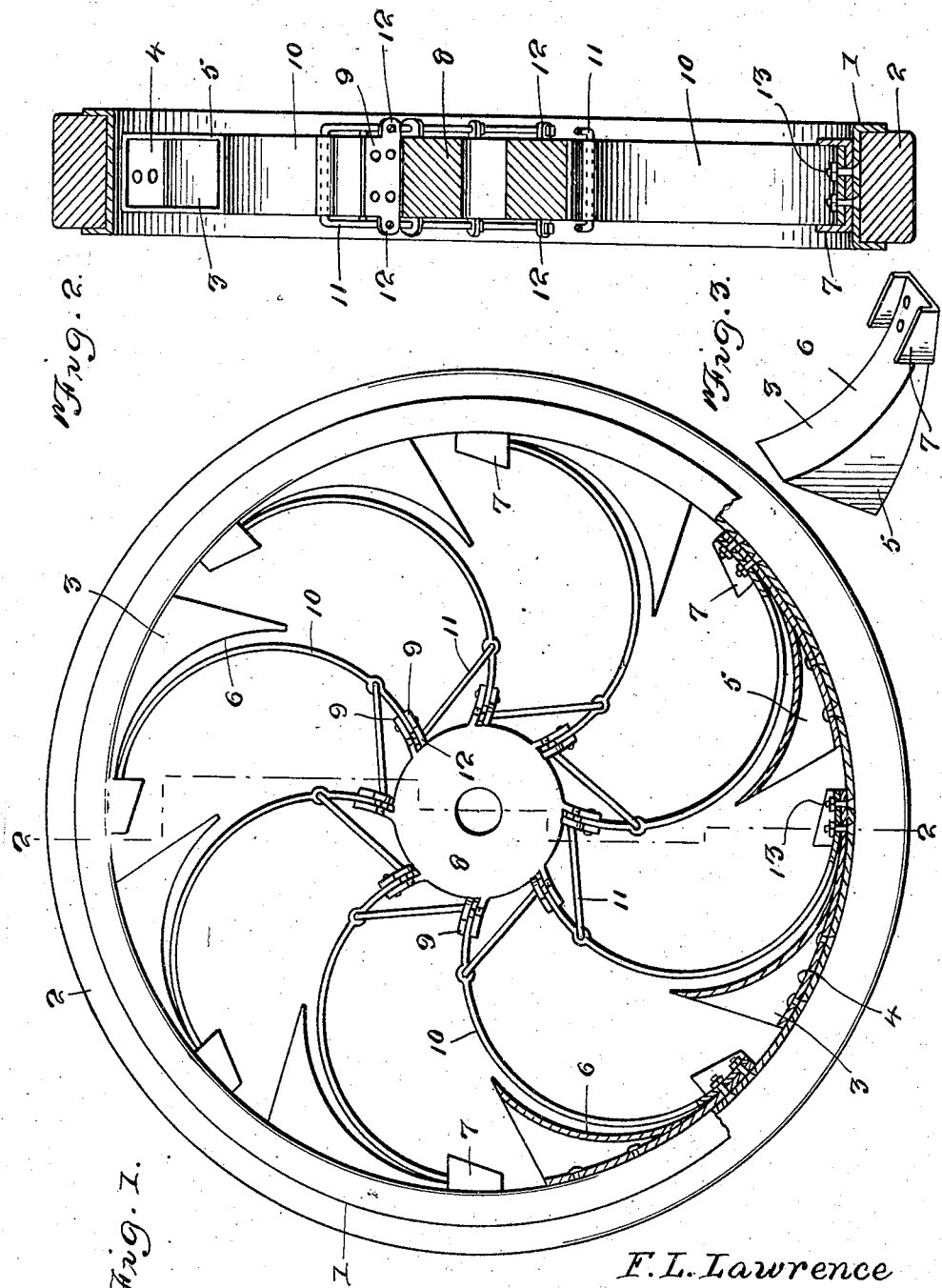
F. L. Lawrence
INVENTOR
BY *Victor J. Evans*
ATTORNEY Sept. 20, 1927.                F. L. LAWRENCE                1,643,248
                                   WHEEL
                             Filed March 4, 1927         2 Sheets-Sheet 2
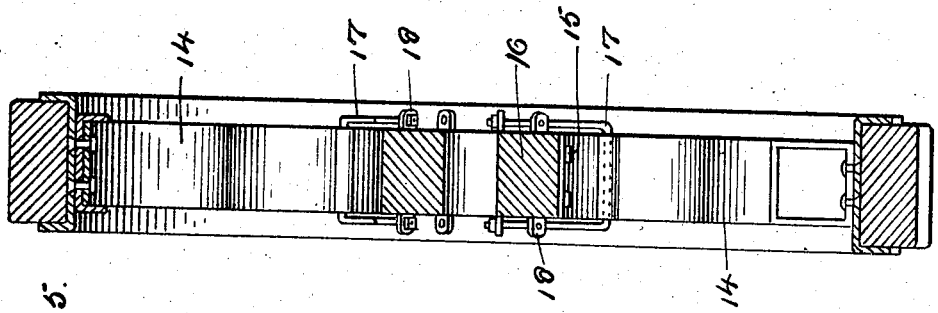
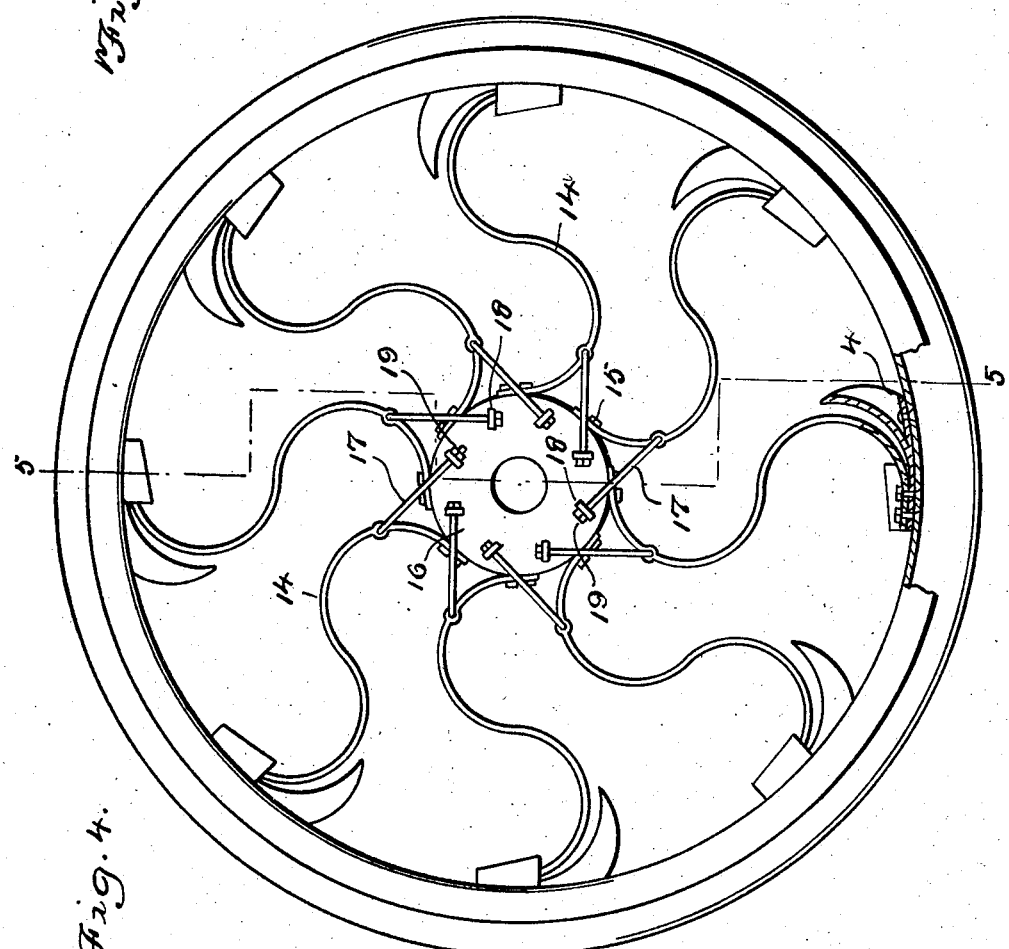
F. L. Lawrence
INVENTOR
BY Victor J. Evans
ATTORNEY Patented Sept. 20, 1927.

1,643,248

UNITED STATES PATENT OFFICE.

FLOYD L. LAWRENCE, OF MOBILE, ALABAMA.

WHEEL.

Application filed March 4, 1927. Serial No. 172,834.

My present invention has reference to vehicle wheels and my object is the provision of a solid tire wheel that will have a resiliency equaling that or in excess of a pneumatic tire wheel.

A further object is the provision of a vehicle wheel with spring spokes, means on the rim of the wheel for contacting with the spokes when the latter are under severe tension to absorb shocks to which the spokes may be subjected and thereby prevent the breaking of the spokes in addition to which there is brace means between the hub and the spokes adjacent to the connection of the spokes with said hub which prevents any free turning of the hub in the initial rotation of the wheel.

A further object is the provision of a vehicle wheel in which the parts constituting the same may be easily and quickly associated in the building of the wheel and likewise easily and quickly disassociated as when a broken part is to be replaced without interfering with the remaining parts.

To the attainment of the above broadly stated objects and many others which will present themselves as the nature of the invention is better understood, the improvement further resides in certain novel features of construction, combination and operative association of parts, a satisfactory embodiment of which is disclosed by the accompanying drawings.

In the drawings:

Figure 1 is a side elevation of a shock absorbing wheel in accordance with this invention, parts being in section.

Figure 2 is a sectional view approximately on the line 2—2 of Figure 1.

Figure 3 is a perspective view of one of the buffer members.

Figure 4 is a side elevation of a second form of the improvement.

Figure 5 is a sectional view on the line 5—5 of Figure 4.

Preferably but not necessarily my improved shock absorbing wheel is wholly constructed of metal, and in both of the illustrative embodiments of my device, a channeled rim 1 is employed, and in this rim there is seated a solid tire 2. On the inner face of the rim 1 at equidistantly spaced intervals there are secured buffer members 3. The buffer members have arcuate base portions corresponding to the contour of the rim 1, and these base portions 4 are bolted to the said rim. The buffer members are provided with sides 5 that merge into the arched top or face 6, and the sides 5 at the lower edge of the buffer member are formed with outstanding flanges 7.

The hub 8, in the construction illustrated in Figures 1 and 2 of the drawings, is peripherally formed with equidistantly spaced pairs of outstanding ears 9, respectively, and between each of these ears there is secured a curved spoke 10. Each spoke is formed of a flat steel plate and the outer edges of the spokes are received between the flanges 7, but the remainder of the spokes is slightly spaced away from the arched face 6 of the buffer members 3. Each spoke 10, at a suitable distance from its connection with the ears 9, is preferably thickened and the said thickened portion is centrally formed with a transverse opening. Through each of these openings there is passed the central or connecting element of U- or yoke-shaped members 11 and the ends of these members are secured to lugs 12 which extend laterally from the ears 9. The yokes 11 provide braces for the curved spring spokes 10 and prevent any tendency of independent movement of the hub 8 when the wheel is first revolved. The ends of the spokes that rest on the inner or reduced ends of the buffer members 3 are bolted or otherwise removably secured to the buffer members, as indicated by the numerals 13, and these securing means also pass through the rim 1 as well as the said buffer members. In this connection it should be stated that the attaching means between the spokes and the hub are likewise in the nature of removable elements which is also true with respect to the brace yokes 11.

In the construction illustrated in Figures 4 and 5 of the drawings, I employ substantially S-shaped steel spokes 14, the said spokes being connected to the rim and to the ends of the buffer members 3 in a manner as previously described. The inner ends of these spokes are bolted, as at 15, to the periphery of the hub 16. The spokes 14 at points adjacent to and equidistant from their connection with the hub 16 are thickened and provided with openings through the said thickened portions and through these openings there are passed the central elements of yokes 17 that are connected to ears 18 by removable means 19, the said ears being located on the opposite sides of the hub 16. The yokes 17 brace the spokes adjacent to their connection with the hub in the same manner and for the same purpose as the yokes 11.

As the spokes are equidistantly spaced and curved an equal pressure is exerted on all of the spokes when the wheel revolves. The brace means as stated, prevent any tendency of movement of the hub independent of the spokes, which is a material advantage in wheels of this type. Any abnormal strain to which the spokes are subjected will be absorbed by the contact of the said spokes with the buffer members 3. The construction is simple and a wheel in accordance with my invention may be cheaply manufactured. The wheel will afford a resiliency equal to or greater than that of a pneumatic tire wheel, and while the parts constituting the improvement are not liable to breakage any one of the elements thereof may be disconnected without interfering with the remainder of the wheel construction.

Having described the invention, I claim:—

1. In a wheel construction, a tire carrying rim, equidistantly spaced arched buffer members on the inner periphery of the rim, a hub, and curved spokes secured to the hub and to the reduced ends of the buffer members and the remainder of the said spokes being spaced from said buffer members.

2. In a vehicle wheel, a tire carrying rim, equidistantly spaced buffer members on the inner periphery of the rim, each of said buffer members including a base, an arched face portion and sides connecting the face portion with the base, said sides at the reduced ends of the buffer members having flanges, a hub, and curved spokes secured to the hub and between the flanges of the buffer members, the spokes proper being spaced from the buffer members.

3. In a vehicle wheel, a tire carrying rim, equidistantly spaced buffer members on the inner periphery of the rim, each of said buffer members including a base, an arched face portion and sides connecting the face portion with the base, said sides at the reduced ends of the buffer members having flanges, a hub, and curved spokes secured to the hub and between the flanges of the buffer members, the spokes proper being spaced from the buffer members and brace means between the hub and the parts of the spokes adjacent to said hub.

4. In a vehicle wheel, a tire carrying rim, equidistantly spaced buffer members on the inner periphery of the rim, each of said buffer members including a base, an arched face portion and sides connecting the face portion with the base, said sides at the reduced ends of the buffer members having flanges, a hub, and curved spokes secured to the hub and between the flanges of the buffer members, the spokes proper being spaced from the buffer members, and angularly arranged removable brace means between the spokes and the hub.

In testimony whereof I affix my signature.

FLOYD L. LAWRENCE.